Patented Sept. 9, 1952

2,610,174

UNITED STATES PATENT OFFICE 2,610,174

COPOLYMERS OBTAINED FROM TRIFLUOROCHLORETHYLENE AND METHYL METHACRYLATE

Frank Gardiner Pearson, Bryn Mawr, Pa., assignor to American Viscose Corporation, Wilmington, Del., a corporation of Delaware No Drawing. Application October 1, 1948, Serial No. 52,415

1 Claim. (Cl. 260—86.3)

This invention relates to polymeric materials and more particularly to copolymers obtained from trifluorochlorethylene and methyl methacrylate.

The object of the invention is to produce new and useful compositions comprising copolymers of trifluorochlorethylene and methyl methacrylate.

A preferred embodiment of the invention is illustrated in the following example in which the proportions of reactants are given in parts by weight unless otherwise indicated.

Example

A mixture of 12.7 parts of trifluorochlorethylene and 44 parts of methyl methacrylate was sealed in a glass pressure reactor together with 1% (based on monomer weight) of benzoyl peroxide. The reactor was exposed to ultraviolet light for 184 hours, at a temperature of 50° C. The resulting copolymer amounted to 28.3 parts and was soluble in chloroform and acetone, insoluble in alcohols. It was found, by analysis, to contain 70.6 mole per cent of methyl methacrylate. Clear films were cast from chloroform and acetone solutions. The copolymer softened at 120° C. and melted at 260° C.

The ratio of trifluorochlorethylene to methyl methacrylate in the monomer mixture may be varied, useful products being obtained from mixtures containing from 5 to 95% based on the total weight, of either monomer.

The catalysts preferred for use in the practice of this invention are peroxy compounds, that is those compounds which contain an —O—O— linkage. Examples of these compounds are diacyl peroxides, such as benzoyl peroxide, soluble salts of persulfuric acid, such as ammonium and potassium persulfate, alkyl peroxides, such as diethyl peroxide, and alkyl hydroperoxides such as tertiary butyl hydroperoxide.

The process of the invention is generally conducted under the influence of ultraviolet irradiation at temperatures ranging from room temperature to 100° C. and preferably from 50 to 70° C., depending upon the catalyst used. The pressure employed will depend upon the starting monomer ratio and the temperature and is such as to maintain the liquid phase.

The products of this invention are adapted to a variety of uses. They may be used in molding plastics, films, etc., as adhesives, and as coating compositions. For any of these purposes the copolymers may be combined with or prepared in the presence of plasticizers, stabilizers, fillers, pigments, dyes, softeners, natural resins or other synthetic resins.

As a number of apparently widely different embodiments of this invention may be made without departing from the spirit and scope thereof, it is to be understood that the invention is not limited to the specific embodiments thereof except as defined in the appended claim.

I claim:

A copolymer of trifluorochlorethylene and methyl methacrylate containing about 70.6 mole per cent of methyl methacrylate in the copolymer molecule, and the balance trifluorochlorethylene, said copolymer having a softening point of 120° C. and a melting point of 260° C.

FRANK GARDINER PEARSON.

REFERENCES CITED

The following references are of record in the file of this patent:

UNITED STATES PATENTS

| Number | Name | Date |
|---|---|---|
| 2,440,090 | Howk et al. | Apr. 20, 1948 |
| 2,479,367 | Joyce et al. | Aug 16, 1949 |
| 2,500,023 | Burk | Mar. 7, 1950 |

FOREIGN PATENTS

| Number | Country | Date |
|---|---|---|
| 110,457 | Australia | May 9, 1940 |
| 578,168 | Great Britain | June 18, 1946 |